(12) United States Patent
Kim

(10) Patent No.: US 8,174,638 B2
(45) Date of Patent: May 8, 2012

(54) LIQUID CRYSTAL DISPLAY DEVICE

(75) Inventor: Ki-Won Kim, Goyang (KR)

(73) Assignee: LG Display Co., Ltd., Seoul (KR)

(*) Notice: Subject to any disclaimer, the term of this patent is extended or adjusted under 35 U.S.C. 154(b) by 125 days.

(21) Appl. No.: 12/648,102

(22) Filed: Dec. 28, 2009

(65) Prior Publication Data

US 2010/0328573 A1 Dec. 30, 2010

(30) Foreign Application Priority Data

Jun. 24, 2009 (KR) .................. 10-2009-0056639

(51) Int. Cl.
*G02F 1/1333* (2006.01)

(52) U.S. Cl. ............... 349/58; 349/61; 349/62; 349/65; 362/615

(58) Field of Classification Search .................. None
See application file for complete search history.

(56) References Cited

U.S. PATENT DOCUMENTS

| | | | |
|---|---|---|---|
| 6,046,785 A * | 4/2000 | Won ........................ | 349/58 |
| 7,649,589 B2 * | 1/2010 | Kim et al. ................. | 349/62 |
| 2003/0016313 A1 * | 1/2003 | Jeong ....................... | 349/58 |
| 2007/0121023 A1 * | 5/2007 | Yang ........................ | 349/58 |

FOREIGN PATENT DOCUMENTS

CN 1399160 A 2/2003

OTHER PUBLICATIONS

Office Action issued in corresponding Chinese Patent Application No. 200910262398.5, mailed Feb. 16, 2012.

* cited by examiner

*Primary Examiner* — Thanh-Nhan P. Nguyen
(74) *Attorney, Agent, or Firm* — Brinks Hofer Gilson & Lione

(57) ABSTRACT

Disclosed is a liquid crystal display (LCD) device capable of minimizing the occurrence of light leakage at peripheral regions of protrusions by maximizing a distance between an image display region and the protrusions, by forming the protrusions at one or more corners of the light guide plate. The LCD device comprises: a light guide plate having protrusions at one or more corners thereof; a main support having fixing grooves formed at one or more corners thereof corresponding to the corners of the light guide plate, the locking grooves for coupling the protrusions of the light guide plate; an LC panel for displaying an image by using light emitted from the light guide plate; an optical source having one or more light emitting diodes (LEDs) for irradiating light to the light guide plate; a reflection sheet for reflecting light emitted from a rear surface of the light guide plate to the light guide plate; and one or more optical sheets disposed between the light guide plate and the LC panel.

11 Claims, 6 Drawing Sheets

LIQUID CRYSTAL DISPLAY DEVICE

RELATED APPLICATIONS

Pursuant to 35 U.S.C. §119(a), this application claims the benefit of earlier filing date and right of priority to Korean Application No. 10-2009-0056639, filed on Jun. 24, 2009, the content of which is incorporated by reference herein in its entirety.

BACKGROUND

1. Field of the Disclosure

The present disclosure relates to a liquid crystal display (LCD) device, and particularly, to an LCD device capable of preventing light leakage occurring at peripheral regions of protrusions of a light guide plate during an assembly process.

2. Background of the Disclosure

Among flat panel display devices that have been developed so far, a liquid crystal display (LCD) device is being applied to various fields such as a notebook, a monitor, a television, a spaceship and an airplane.

The LCD device is largely classified into an LC panel, a driving circuit unit, and a backlight unit.

The LC Panel displays an image by controlling the amount of transmissive light. The driving circuit unit applies each kind of signal transmitted from a driving system to the LC panel, and controls the signals. And, the backlight unit serves as a light irradiation device for uniformly irradiating light to the entire part of the LC panel. For enhanced efficiency of the backlight unit in the aspects of a thickness, a weight and power consumption, research is being actively performed.

Since the LCD device is not a spontaneous light emitting display device, an additional optical source such as the backlight unit is required. The backlight unit for the LCD device is categorized into a direct type one and an edge type one.

In the case of the edge type backlight unit, a fluorescent lamp is installed at the periphery of a flat panel, and light is made to be incident onto an entire surface of an LC panel from the fluorescent lamp through a transparent light guide plate. Owing to the light guide plate, the edge type backlight unit has a comparatively thin thickness.

In the case of the direct type backlight unit, an optical source is disposed on a rear surface of an LC Panel to directly irradiate light to the entire surface of the LC panel. Differently from the edge type backlight unit, the direct type backlight unit is provided with a plurality of optical sources, thereby enhancing brightness and implementing a wide light emitting area.

The edge type backlight unit has the following disadvantages.

Firstly, the edge type backlight unit has a weight heavier than the direct type backlight unit due to the light guide plate.

Secondly, the edge type backlight unit has lowered optical efficiency due to light absorbed by the light guide plate to disappear.

On the other hand, the direct type backlight unit has the following disadvantages.

Firstly, the direct type backlight unit requires high power consumption and heat radiation amount due to a plurality of lamps, even if it has higher optical efficiency than the edge type backlight unit.

Secondly, the direct type backlight unit has a thick thickness as the lamps are spacing from optical sheets since there is no light guide plate between the lamps and the optical sheets.

The LCD device requires an optical source such as a backlight unit, optical sheets for enhancing optical efficiency by transmitting light emitted from the optical source to the LC panel, a light guide plate serving as a passage of the light transmitted to the LC panel from the optical source, and a case for supporting and fixing the above components.

The LCD device is fabricated by laminating the optical source, the optical sheets, the light guide plate, etc. onto a rear surface of the LC panel, and then by assembling the LC panel to the case.

The conventional LCD device will be explained with reference to FIGS. 1 and 2.

FIG. 1 is a schematic sectional view of an LCD device in accordance with the conventional art.

FIG. 2 is a planar view schematically showing a state that protrusions formed on both side surfaces of a light guide plate are inserted into locking grooves formed on both side surfaces of a main support, and are fixedly supported by the locking grooves.

Referring to FIG. 1, the conventional LCD device comprises a main support 24, a backlight unit and an LC panel 6 each laminated on the main support 24. The backlight unit includes a light guide plate 16 disposed in the main support 24 for transmitting light emitted from a lamp to the LC panel 6, a reflection sheet 18 disposed on a rear surface of the light guide plate 16, a plurality of optical sheets 14 laminated on the light guide plate 16, and a lamp housing (not shown) disposed to encompass the lamp (not shown).

The LC panel 6 is composed of a color filter substrate 3, an array substrate 5, and an LC layer (not shown) disposed between the color filter substrate 3 and the array substrate 5. An upper polarization sheet 4a is attached to the color filter substrate 3, and a lower polarization sheet 4b is attached to a rear surface of the array substrate 5.

A case top 2 encompasses the edges of the LC panel 6 and the side surfaces of the main support 24 by being coupled thereto.

A guide panel 7 supports the LC panel 6, and fixes the optical sheets 14 by being fixed on an upper surface of the main support 24.

The optical sheets 14 include a lower diffusion sheet 14d for diffusing light emitted from the light guide plate 16 to an entire region, two prism sheets 14b and 14c for making the light diffused by the lower diffusion sheet 14d proceed at an angle perpendicular to the LC panel 6, and an upper diffusion sheet 14a for diffusing the light having passed through the two prism sheets 14b and 14c.

The reflection sheet 18 reflects light incident thereon through a rear surface of the light guide plate 16, to the light guide plate 16 again, thereby reducing optical loss.

Protrusions 17 are formed on both side surfaces of the light guide plate 16 with a constant gap therebetween. As shown in FIG. 2, as the protrusions are inserted into locking grooves 24a formed on inner side walls of the main support 24, the light guide plate 16 is fixed to the main support 24 to be supported thereby.

An assembly method for the conventional LCD will be explained as follows.

Firstly, the protrusions 17 formed on both side surfaces of the light guide plate 16 are inserted into the main support 24 to be fixed thereto. Then, the optical sheets 14 are assembled onto the main support 24, and the LC panel 6 is mounted on the optical sheets 14. Next, the case top 2 is assembled to encompass the edges of the LC panel 6 and the side surfaces of the main support 24.

However, the conventional LCD device has the following problems.

Firstly, as the LCD device becomes slimmer and smaller, each component has a thin thickness. Due to a thin thickness of the light guide plate, light leakage occurs at the periphery of the protrusions formed on both side surfaces of the light guide plate. Especially, as shown in FIG. 2, a distance (D1) between an image display region (P1) and the protrusions of the light guide plate becomes shorter. In this case, when the light guide plate is not properly assembled to inside of the main support by using the protrusions, light leakage may occur.

SUMMARY

A liquid crystal display (LCD) device, comprises: a light guide plate having protrusions at one or more corners thereof; a main support having protrusions formed at one or more corners thereof corresponding to the corners of the light guide plate, the protrusions for coupling the protrusions of the light guide plate; an LC panel for displaying an image by using light emitted from the light guide plate; an optical source having one or more light emitting diodes (LEDs) for irradiating light to the light guide plate; a reflection sheet for reflecting light emitted from a rear surface of the light guide plate to the light guide plate; and one or more optical sheets disposed between the light guide plate and the LC panel.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EXEMPLARY EMBODIMENTS

Hereinafter, a liquid crystal display (LCD) device according to the present invention will be explained in more detail with reference to the attached drawings.

Figure 1:
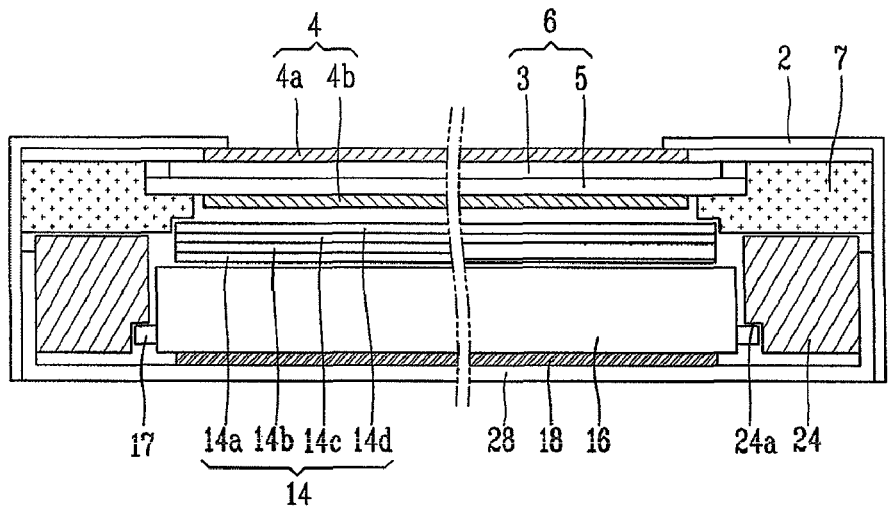
FIG. 1 is a schematic sectional view of an LCD device in accordance with the conventional art.
Figure 2:
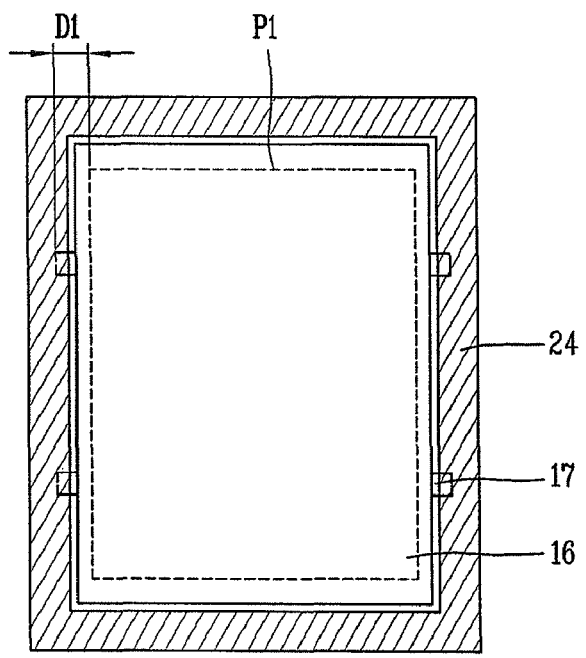
FIG. 2 is a planar view schematically showing a state that protrusions formed on both side surfaces of a light guide plate are inserted into protrusions formed on both side surfaces of a main support, and are fixedly supported by the protrusions.
Figure 3:
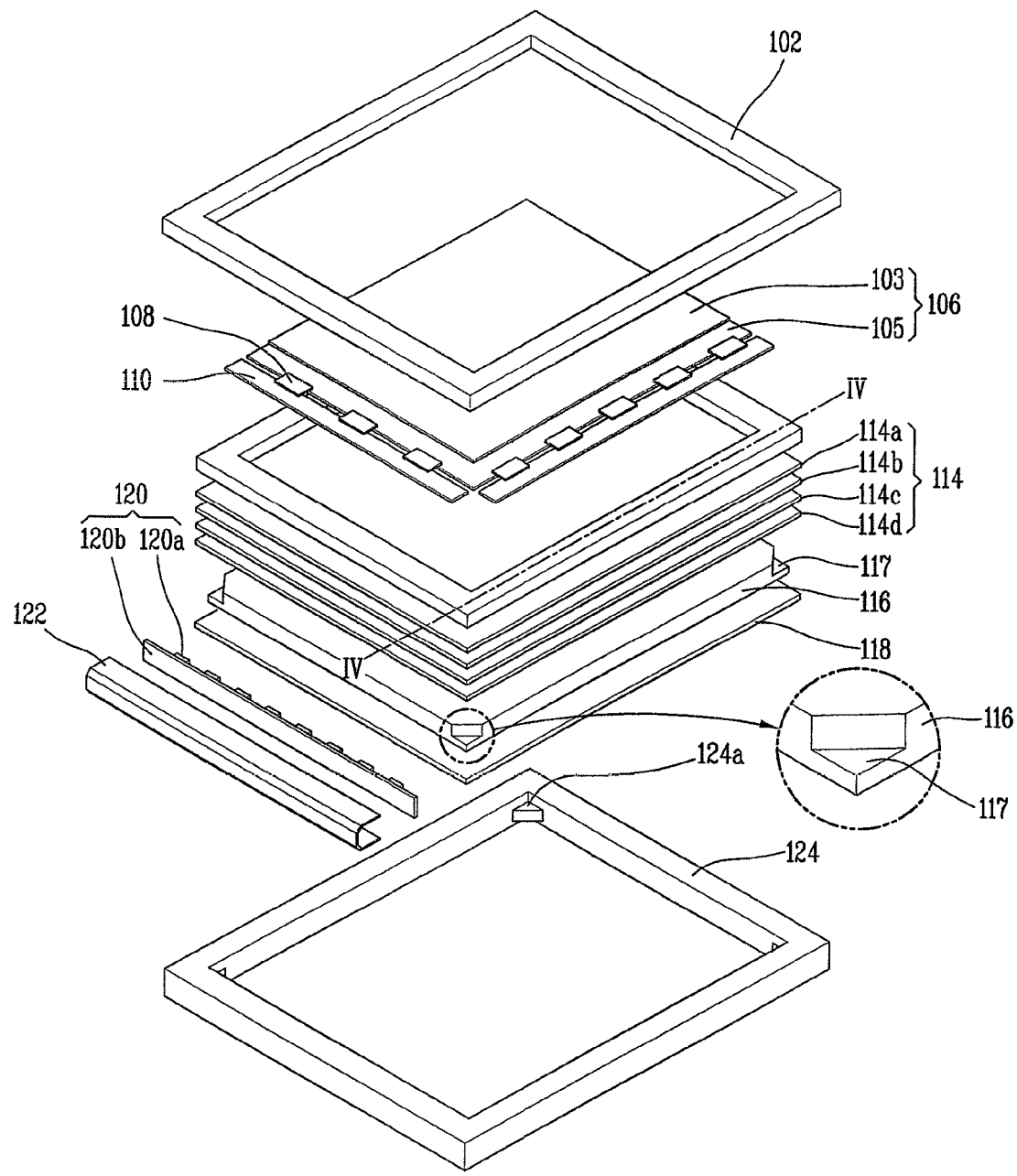
FIG. 3 is an exploded perspective view of an LCD device according to a first embodiment of the present disclosure.
Figure 4:
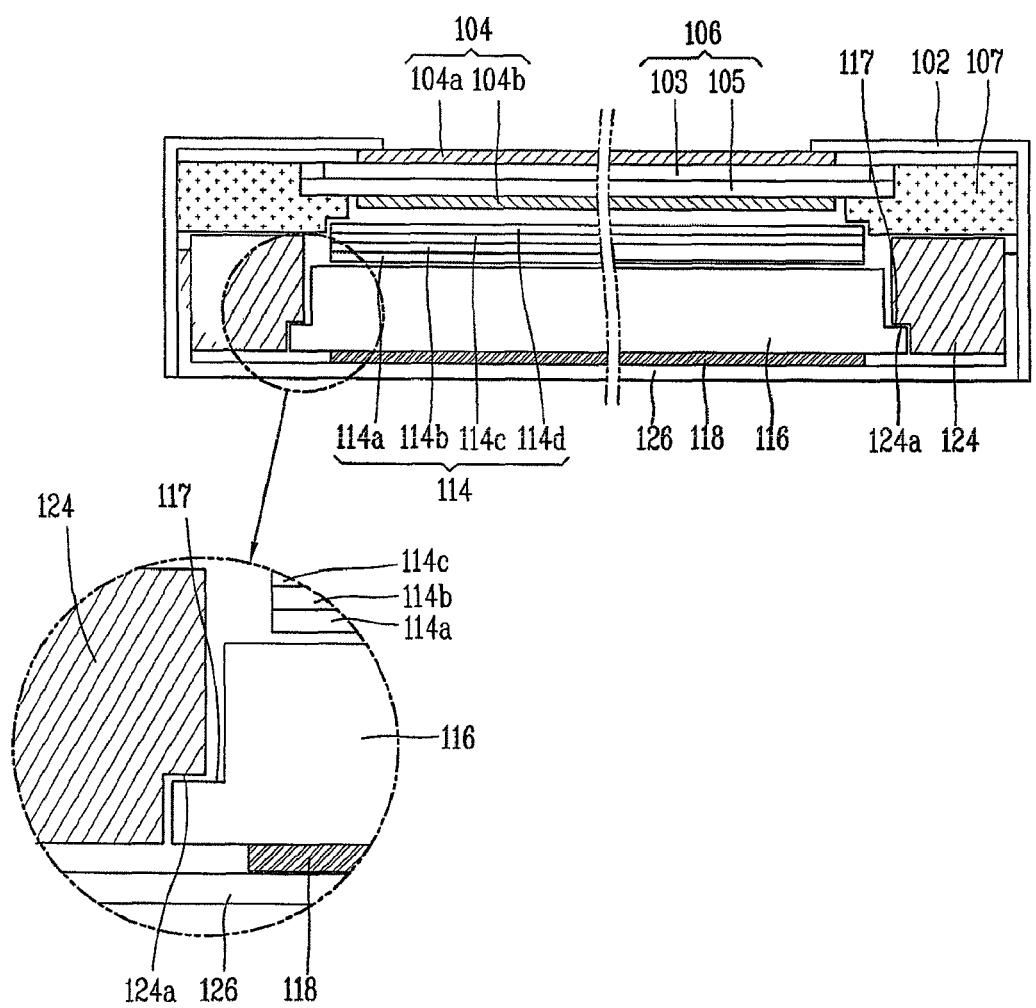
FIG. 4 is a schematic sectional view taken along line 'IV-IV' in the LCD device of FIG. 1.
Figure 5:
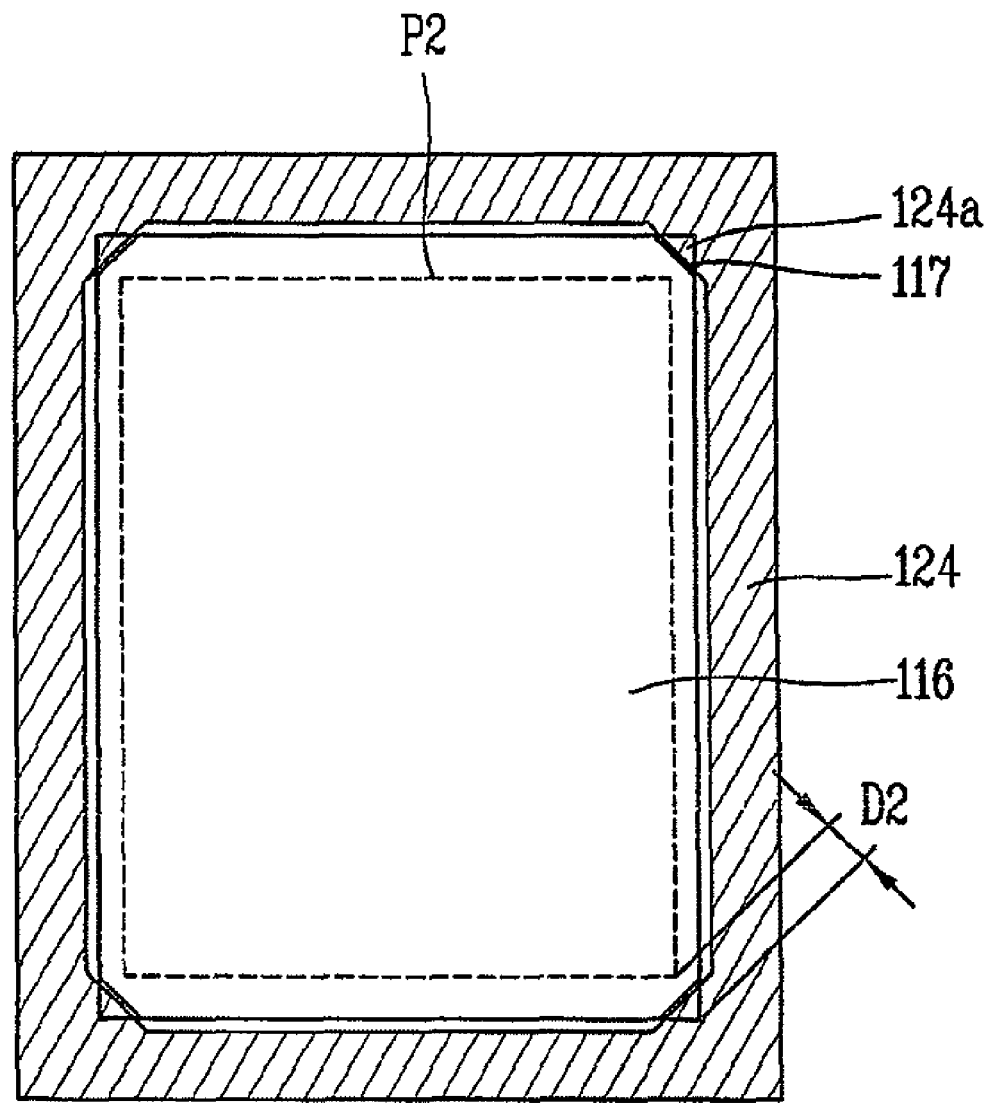
FIG. 5 is a planar view showing a state that a light guide plate has been assembled to a main support of the LCD device according to a first embodiment of the present disclosure, in which protrusions formed at the corners of the light guide plate are inserted into protrusions disposed inside the main support thus to be supported thereby.

FIG. 3 is an exploded perspective view of an LCD device according to a first embodiment of the present invention, FIG. 4 is a schematic sectional view taken along line 'IV-IV' of the LCD device of FIG. 1, and FIG. 5 is a planar view showing a state that a light guide plate has been assembled to a main support of the LCD device according to a first embodiment of the present invention, in which inserting grooves formed at the corners of the light guide plate are inserted into protrusions disposed inside the main support thus to be supported thereby.

Referring to FIGS. 3 and 4, the LCD device according to the first embodiment of the present invention comprises a main support 124, a backlight unit and an LC panel 106 laminated on the main support 124, a guide panel 107 disposed on the main support 124, for supporting the LC panel 106 and fixing optical sheets 114 of the backlight unit, and a case top 102 for encompassing the corners of the LC panel 106 and the side surfaces of the main support 124.

The main support 124 is formed of molding material, and is provided with protrusions protrusions 124a formed on inner side walls of the corners thereof for insertion-fixing the corners of the light guide plate 116 on a lowermost layer inside the main support 124, mounted is the backlight unit (not shown) including a reflection sheet 118, a light guide plate 116, a plurality of optical sheets 114, an optical source 120, and a lamp housing 122 disposed to encompass the optical source 120.

More specifically, the backlight unit includes an optical source 120 composed of LEDs 120a and a board 120b having the LEDs 120a mounted thereon, a lamp housing 122 disposed to encompass the optical source 120, a light guide plate 116 for transmitting light emitted from the optical source 120 to the LC panel 106, a reflection sheet 118 disposed on a rear surface of the light guide plate 116, and a plurality of optical sheets 114 laminated on the light guide plate 116.

The light guide plate 116 provides an optical path so that light emitted from the light source 120 can be incident on the entire part of a lower surface of the LC panel 106. The light guide plate 116 is formed of Poly Methyl Metharylate Acrylate (PMMA). At one side of the light guide plate 116 (i.e., a light incidence surface), the optical source 120 and the lamp housing 122 are positioned, which are used as an optical source of the LC panel 106. And, locking grooves 117 having a thickness thinner than the light guide plate 116 are protruding from an upper surface of each edge of the light guide plate 116. In the first embodiment, the locking grooves 117 are formed at the respective corners of the light guide plate 116. However, the locking groove 117 may be also formed at one or more corners of the light guide plate 116.

The locking groove 117 formed on the upper surface of the respective corners of the light guide plate 116 are insertion-fixed to the protrusions 124a formed at the corners of the main support 124 installed on a rear surface of the light guide plate 116 in a state that the reflection sheet 118 is disposed therebetween.

Light emitted from the optical source 120 is made to be incident onto the light guide plate 116 through the light incident surface formed on the side surface of the light guide plate 116.

And, the lamp housing 122 is formed to encompass the optical source 120, and reflects light emitted from the optical source 120 to the light incident surface formed on the side surface of the light guide plate 116.

The LC panel 106 is composed of an upper substrate 103 and a lower substrate 105. Liquid crystal is injected into a part between the upper and lower substrates 103 and 105. And, the LC panel 106 is provided with a spacer (not shown) for maintaining a constant distance between the upper and lower substrates 103 and 105.

Although not shown, a color filter, a common electrode, a black matrix, etc. are formed on the upper substrate 103 of the LC panel 106. Although not shown, signal wires such as data lines and gate lines are formed on the lower substrate 105 of the LC panel 106. And, a thin film transistor (TFT) is formed at each intersection between the data lines and the gate lines.

The TFT switches a data signal to be transmitted to an LC cell from the data lines in response to a scan signal (or gate pulse) supplied from the gate lines.

A pixel electrode is formed at each pixel region between the data lines and the gate lines. At one side of the LC panel 106, formed is a signal line pad region (not shown) to which the data lines and the gate lines are connected. To the signal line pad region, attached is a tape carrier package 108 having thereon a driver integrated circuit 110 for applying a driving signal to the TFT. The tape carrier package 108 supplies a data signal from the driver integrated circuit 110 to the data lines, and supplies a scan signal to the gate lines.

An upper polarization sheet 104a is attached to the upper substrate 103 of the LC panel 106, and a lower polarization sheet 104b is attached to a rear surface of the lower substrate 105.

The case top 102 is formed in a quadrangular belt having a planar surface and lateral surfaces bent from the planar surface at 90°. And, the case top 102 is coupled to the edge of the LC panel 106 and the main support 124 to encompass them.

The guide panel 107 supports the LC panel 106, and fixes the optical sheets 114 by being fixed to the main support 124. And, the reflection sheet 118 reflects light incident thereon through a rear surface of the light guide plate 116, to the light guide plate 116 again, thereby reducing optical loss. That is, the reflection sheet 118 makes light emitted from the optical source 120 proceed at 90°, thereby enhancing optical efficiency. For this, the optical sheets 114 include a lower diffusion sheet 114d for diffusing light emitted from the light guide plate 116 to an entire region, two prism sheets 114b and 114c for making the light diffused by the lower diffusion sheet 114d proceed at an angle perpendicular to the LC panel 106, and an upper diffusion sheet 114a for diffusing the light having passed through the two prism sheets 114b and 114c. Accordingly, light emitted from the light guide plate 116 is made to be incident onto the LC panel 106 via the optical sheets 114.

An assembly method for the LCD module will be explained as follows.

Firstly, the reflection sheet 118 is disposed on an inner lower surface of the main support 124. Then, the locking grooves 117 formed on each edge of the light guide plate 116 are inserted into the protrusions 124a formed on inner side walls of the corners of the main support 124, thereby fixedly supporting the light guide plate 116. Then, the optical sheets 114 are assembled onto an upper surface of the light guide plate 116. Then, the LC panel 106 is mounted on the optical sheets 114. And, the case top 102 is then assembled to encompass the corners of the LC panel 106 and the side surfaces of the main support 124.

As shown in FIG. 5, the locking grooves 117 formed at the corners of the light guide plate 116 are insertion-fixed to the protrusions 124a of the main support 124 thus to be supported thereby. And, a distance (D2) between an image display region (P2) and the protrusions 117 is maximized, thereby effectively preventing light leakage occurring at the protrusions 117.

Hereinafter, an LCD device according to a second embodiment of the present invention will be explained with reference to FIGS. 6 and 7.

Figure 6:
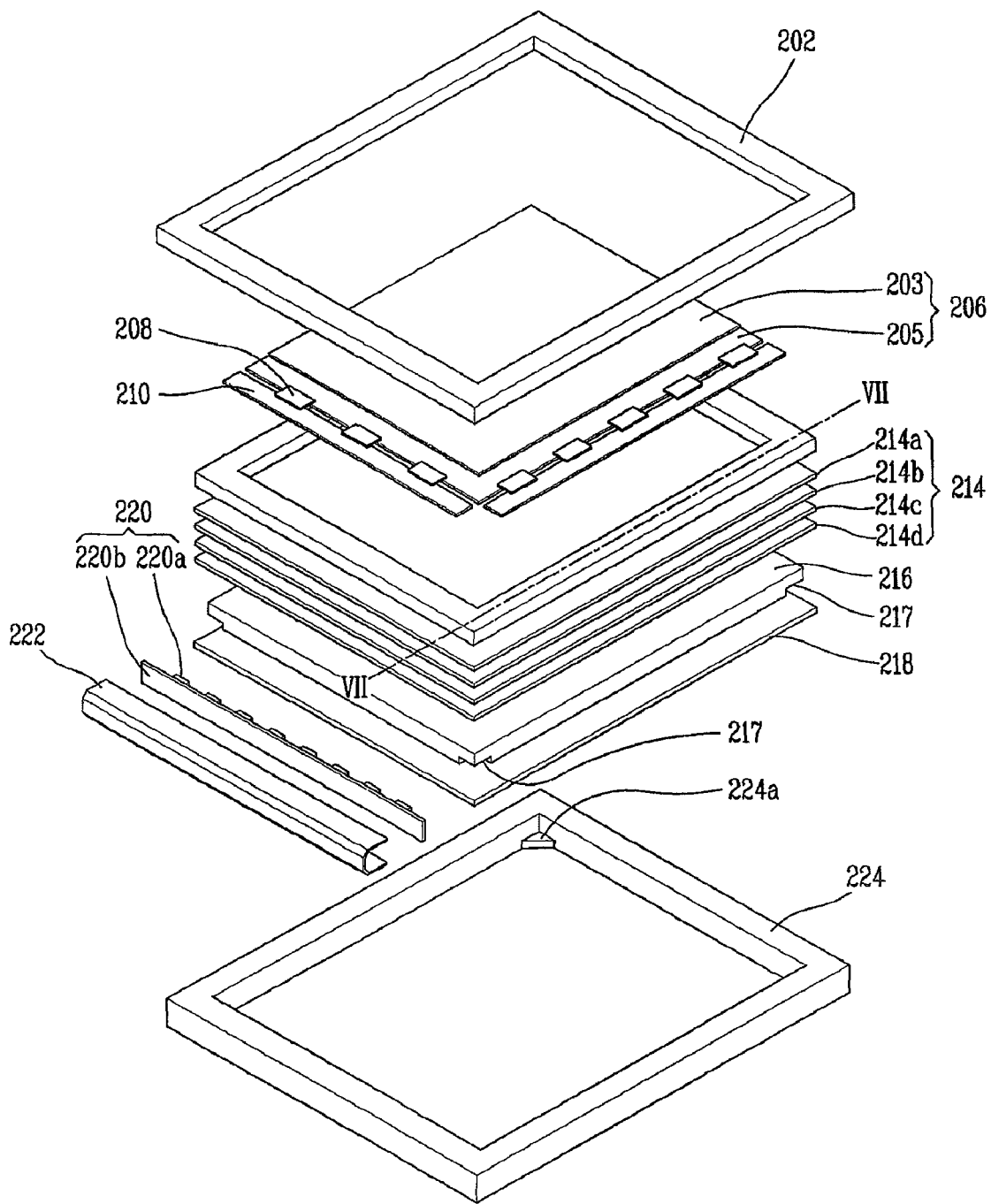
FIG. 6 is an exploded perspective view of an LCD device according to a second embodiment of the present disclosure.
Figure 7:
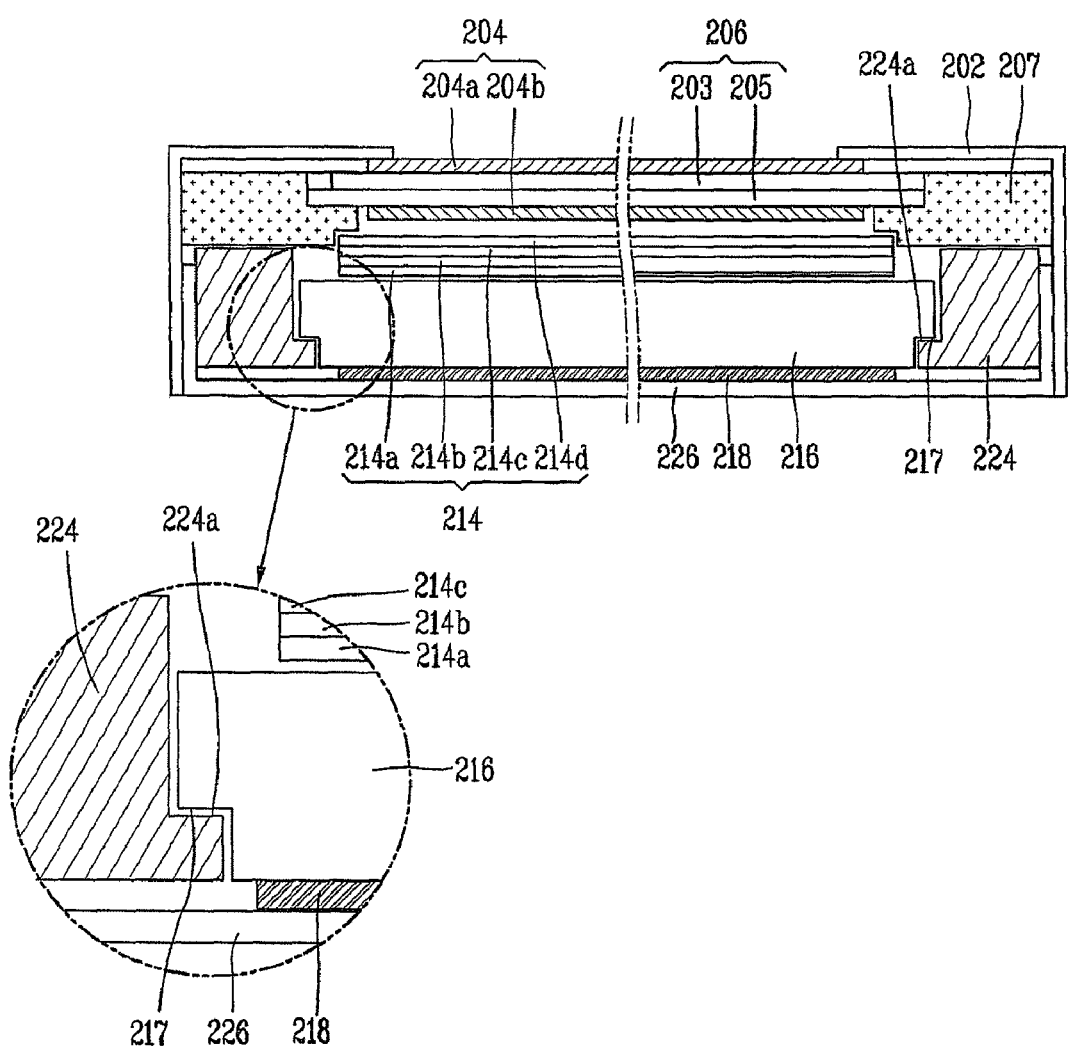
FIG. 7 is a schematic sectional view taken along line in the LCD device of FIG. 6.

FIG. 6 is an exploded perspective view of an LCD device according to a second embodiment of the present invention, and FIG. 7 is a schematic sectional view taken along line 'VII-VII' in the LCD device of FIG. 6.

Referring to FIGS. 6 and 7, the LCD device according to the second embodiment of the present invention comprises a main support 224, a backlight unit and an LC panel 206 laminated on the main support 224, a guide panel 207 disposed on the main support 224 for supporting the LC panel 206 and fixing optical sheets 214 of the backlight unit, and a case top 202 for encompassing the corners of the LC panel 206 and the side surfaces of the main support 224.

The main support 224 is formed of molding material, and is provided with mounting grooves 224a formed on inner side walls of the corners thereof for insertion-fixing the corners of a light guide plate 216.

On a lowermost layer inside the main support 224, mounted is the backlight unit (not shown) including a reflection sheet 218, a light guide plate 216, a plurality of optical sheets 214, an optical source 220, and a lamp housing 222 disposed to encompass the optical source 220.

More specifically, the backlight unit includes an optical source 220 composed of LEDs 220a and a board 220b having the LEDs 220a mounted thereon, a lamp housing 222 disposed to encompass the optical source 220, a light guide plate 216 for transmitting light emitted from the optical source 220 to the LC panel 206, a reflection sheet 218 disposed on a rear surface of the light guide plate 216, and a plurality of optical sheets 214 laminated on the light guide plate 216.

The light guide plate 216 provides an optical path so that light emitted from the light source 220 can be incident on a lower entire surface of the LC panel 206. The light guide plate 216 is formed of Poly Methyl Metharylate Acrylate (PMMA). At one side of the light guide plate 216 (i.e., a light incidence surface), the optical source 220 and the lamp housing 222 are positioned, which are used as an optical source of the LC panel 206. And, locking grooves 217 having a thickness thinner than the light guide plate 216 are protruding from lower surfaces of the respective corners of the light guide plate 216. In the second embodiment, the locking grooves 217 are formed at the respective corners of the light guide plate 216. However, the locking groove 217 may be also formed at one or more corners of the light guide plate 216.

The locking grooves 217 formed on the lower surface of the respective corners of the light guide plate 216 are mounted to the mounting protrusions 224a formed at the corners of the main support 124 installed on a rear surface of the light guide plate 216 in a state that the reflection sheet 218 is disposed therebetween. Accordingly, the locking grooves 217 are supported by the mounting protrusions 224a.

Light emitted from the optical source 220 is made to be incident onto the light guide plate 216 through a light incidence surface formed on the side surface of the light guide plate 216.

And, the lamp housing 222 is formed to encompass the optical source 220, and reflects light emitted from the optical source 220 to the light incidence surface formed on the side surface of the light guide plate 216.

The LC panel 206 is composed of an upper substrate 203 and a lower substrate 205. Liquid crystal is injected into a part between the upper and lower substrates 203 and 205. And, the LC panel 206 is provided with a spacer (not shown) for maintaining a constant distance between the upper and lower substrates 203 and 205.

Although not shown, a color filter, a common electrode, a black matrix, etc. are formed on the upper substrate 203 of the LC panel 206. Although not shown, signal wires such as data lines and gate lines are formed on the lower substrate 205 of the LC panel 206. And, a thin film transistor (TFT) is formed at each intersection between the data lines and the gate lines.

The TFT switches a data signal to be transmitted to an LC cell from the data lines in response to a scan signal (or gate pulse) supplied from the gate lines.

A pixel electrode is formed at each pixel region between the data lines and the gate lines. At one side of the LC panel 206, formed is a signal line pad region (not shown) to which the data lines and the gate lines are connected. To the signal line pad region, attached is a tape carrier package 208 having thereon a driver integrated circuit 210 for applying a driving signal to the TFT. The tape carrier package 208 supplies a data signal from the driver integrated circuit 210 to the data lines, and supplies a scan signal to the gate lines.

An upper polarization sheet 204a is attached to the upper substrate 203 of the LC panel 206, and a lower polarization sheet 204b is attached to a rear surface of the lower substrate 205.

The case top 202 is formed in a quadrangular belt having a planar surface and lateral surfaces bent from the planar surface at 90°. And, the case top 202 is coupled to the corners of the LC panel 206 and the side surfaces of the main support 224 to encompass them.

The guide panel 207 supports the LC panel 206, and fixes the optical sheets 214 by being fixed to the main support 224. And, the reflection sheet 218 reflects light incident thereon through a rear surface of the light guide plate 216, to the light guide plate 216 again, thereby reducing optical loss. That is, the reflection sheet 218 makes light emitted from the optical source 220 proceed at 90°, thereby enhancing optical efficiency. For this, the optical sheets 214 include a lower diffusion sheet 214d for diffusing light emitted from the light guide plate 216 to an entire region, two prism sheets 214b and 214c for making the light diffused by the lower diffusion sheet 214d proceed at an angle perpendicular to the LC panel 206, and an upper diffusion sheet 214a for diffusing the light having passed through the two prism sheets 214b and 214c. Accordingly, light emitted from the light guide plate 216 is made to be incident onto the LC panel 206 via the optical sheets 214.

An assembly method for the LCD module will be explained as follows.

Firstly, the reflection sheet 218 is disposed on an inner lower surface of the main support 224. Then, the locking grooves 217 formed on each edge of the light guide plate 216 are inserted into the mounting protrusions 224a formed on inner side walls of the corners of the main support 224, thereby fixedly supporting the light guide plate 216. Then, the optical sheets 214 are assembled onto an upper surface of the light guide plate 216. Then, the LC panel 206 is mounted on the optical sheets 214.

And, the case top 202 is then assembled to encompass the corners of the LC panel 206 and the side surfaces of the main support 224.

As shown in FIG. 5, the locking grooves 217 formed at the lower surface of the corners of the light guide plate 216 are insertion-fixed to the mounting grooves 224a of the main support 224 thus to be supported thereby. And, a distance (D2) between an image display region (P2) and the locking grooves 217 is maximized, thereby effectively preventing light leakage occurring at the locking grooves 217.

That is, in the LCD device according to the present invention, the protrusions are formed at the corners of the light guide plate, and are insertion-fixed to the main support thus to be supported. And, the distance between the image display region and the protrusions is maximized, thereby effectively preventing the occurrence of light leakage at the protrusions.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A liquid crystal display (LCD) device, comprising:
   a light guide plate having locking grooves at corners thereof;
   a main support having protrusions at corners thereof corresponding to the corners of the light guide plate, the locking grooves of the light guide plate are insertion-fixed to the protrusions;
   an LC panel for displaying an image by using light emitted from the light guide plate; and
   an optical source having one or more light emitting diodes (LEDs) for irradiating light to the light guide plate.

2. The LCD device of claim 1, wherein the locking grooves are formed at one or more corners of the light guide plate.

3. The LCD device of claim 1, wherein the locking grooves are on an upper surface of the corner of the light guide plate, and the protrusions are implemented as protrusions at a lower part of an inner side wall of the corner of the main support corresponding to the corner of the light guide plate.

4. The LCD device of claim 1, wherein the locking grooves are on a lower surface of the corner of the light guide plate, and the fixing protrusions are implemented as mounting protrusions at a lower part of an inner side wall of the corner of the main support corresponding to the corner of the light guide plate.

5. The LCD device of claim 1, further comprising a reflection sheet for reflecting light emitted from a rear surface of the light guide plate to the light guide plate;
   and one or more optical sheets disposed between the light guide plate and the LC panel.

6. A liquid crystal display (LCD) device, comprising:
   a light guide plate having locking grooves at corners thereof;
   a main support having protrusions at corners thereof corresponding to the corners of the light guide plate, the locking grooves of the light guide plate are insertion-fixed to the protrusions;
   an LC panel for displaying an image by using light emitted from the light guide plate;
   an optical source having one or more light emitting diodes (LEDs) for irradiating light to the light guide plate;

a reflection sheet for reflecting light emitted from a rear surface of the light guide plate to the light guide plate; and one or more optical sheets disposed between the light guide plate and the LC panel.

7. The LCD device of claim 6, wherein the locking grooves are formed at one or more corners of the light guide plate.

8. The LCD device of claim 6, wherein the locking grooves are on an upper surface of the corner of the light guide plate, and the protrusions are implemented as protrusions formed at a lower part of an inner side wall of the corner of the main support corresponding to the corner of the light guide plate.

9. The LCD device of claim 6, wherein the locking grooves are on a lower surface of the corner of the light guide plate, and the protrusions are implemented as mounting protrusions at a lower part of an inner side wall of the corner of the main support corresponding to the corner of the light guide plate.

10. A liquid crystal display (LCD) device, comprising:
   a light guide plate having locking grooves at corners thereof;
   a main support having protrusions at corners thereof corresponding to the corners of the light guide plate, the locking grooves of the light guide plate are insertion-fixed to the protrusions, wherein the locking grooves are on an upper or lower surface of the corner of the light guide plate, and the fixing protrusions are implemented as protrusions at a lower part of an inner side wall of the corner of the main support corresponding to the corner of the light guide plate;
   an LC panel for displaying an image by using light emitted from the light guide plate;
   an optical source having one or more light emitting diodes (LEDs) for irradiating light to the light guide plate;
   a reflection sheet for reflecting light emitted from a rear surface of the light guide plate to the light guide plate; and
   one or more optical sheets disposed between the light guide plate and the LC panel.

11. The LCD device of claim 10, wherein the locking grooves are formed at one or more corners of the light guide plate.

* * * * *